(12) United States Patent
Duda (10) Patent No.: US 6,275,877 B1
(45) Date of Patent: Aug. 14, 2001

(54) MEMORY ACCESS CONTROLLER

(76) Inventor: James Duda, 17 Pleasant St., Waltham, MA (US) 02452

(*) Notice: Subject to any disclaimer, the term of this patent is extended or adjusted under 35 U.S.C. 154(b) by 0 days.

(21) Appl. No.: 09/179,946

(22) Filed: Oct. 27, 1998

(51) Int. Cl.[7] .................................................. G06F 13/14
(52) U.S. Cl. .............................. 710/23; 710/33; 710/72; 709/229; 709/230
(58) Field of Search ................................ 710/23, 72, 33; 709/229, 230

(56) References Cited

U.S. PATENT DOCUMENTS

| | | | | |
|---|---|---|---|---|
| 5,388,237 | * | 2/1995 | Sodos ..................................... | 710/22 |
| 5,765,023 | * | 6/1998 | Leger et al. ........................... | 710/22 |
| 5,828,856 | * | 10/1998 | Bowes et al. .......................... | 710/129 |
| 5,870,627 | * | 2/1999 | O'Toole et al. ........................ | 710/22 |
| 5,905,912 | * | 5/1999 | Story et al. ............................ | 710/27 |
| 5,944,800 | * | 8/1999 | Mattheis et al. ....................... | 710/23 |
| 5,961,614 | * | 10/1999 | Christiansen .......................... | 710/22 |
| 6,026,443 | * | 2/2000 | Oskouy et al. ........................ | 709/230 |
| 6,049,842 | * | 4/2000 | Garrett et al. ......................... | 710/33 |
| 6,070,194 | * | 5/2000 | Yu et al. ................................ | 709/229 |

\* cited by examiner

*Primary Examiner*—Thomas Lee
*Assistant Examiner*—Abdelmoniem Elamin (57) ABSTRACT

A direct memory access controller is provided which utilizes a single dedicated controller to control all or substantially all memory accesses in a computer system, both memory-to-memory accesses within the system and transfers between system memory and various system peripherals. At least portions of the controller are time shared by various channels, each channel performing data transfers in a selected direction between a system memory component and a second component which may be a peripheral, another memory component or the like. An arbiter is provided as part of the controller for determining the channel using shared resources at any given time. Where one of the peripherals is a variable length packetized data source, multiple subchannels may be provided for transfers of data for such source into system memory, each such subchannel being for transfers to buffers of different size. Efficient memory utilization is achieved by determining the size of an incoming variable length packet and having the transfer performed through the channel servicing the smallest available buffer in which incoming variable length packetized data will fit.

23 Claims, 1 Drawing Sheet

MEMORY ACCESS CONTROLLER

FIELD OF THE INVENTION

This invention relates to direct memory access (DMA) control for a computer system and more particularly to a method and apparatus for utilizing a single dedicated memory controller to control all memory accesses in a computer system, both memory to memory accesses within the system and transfers between a system memory and various system peripherals.

BACKGROUND OF THE INVENTION

Many data processing operations in a computer system involve the movement of large amounts of data. Some of these data movements, including those involving various virtual memory or cache memory operations, involve the movement of data between various memories, generally random access memories, within the system, while other operations involve receiving or transmitting data through appropriate serial, parallel or other ports to system peripherals, which, for purposes of this invention, are considered to be various input/outputs (I/O) for the system. Such I/Os include, but are by no means limited to, printers, displays, modems, disc drives, fixed or variable length packetized data channels such as Ethernet, HDLC or token ring, optical disc drive, floppy drive, etc. An external processor may also require access to at least a selected portion of a system memory. Transfers of data between a system peripheral and a system memory, or between system memories, is complicated by the fact that the peripheral/ memories frequently operate at different speeds, requiring buffering of data to effect efficient transfer, and that the peripherals/memories may have different format protocols.

In current systems, the burden of controlling the transfer of data between system memories and between peripherals and a system memory generally falls on the system processor. In some applications, the processor can spend a majority of its time handling such memory transfers, significantly reducing the capacity of the processor to perform other functions. The burden on the processor of controlling memory accesses thus significantly reduces the processing speed and efficiency of a given computer system and results in a significant reduction in the volume of work which the processor can perform. While various direct memory access (DMA) controllers have been proposed for reducing the DMA burden on a system processor, these controllers have generally been useful for only a single channel (i.e., the interfacing of a memory in a single direction with a peripheral or with another system memory) and have therefore dealt with only a portion of the problem. In order to deal with all modes of data transfer in a given system, a separate DMA controller of these types is required for each channel. Since a system may contain ten or more channels, existing controllers require significant circuitry dedicated to the DMA function, resulting in system boards of a size and cost which may not be acceptable for many applications.

A need therefore exists for an improved DMA controller which is capable of independently or substantially independently handling all, or at least substantially all, transfers of data between system memories, and between various peripherals and system memory with minimum processor involvement, thereby freeing the processor from the burden of performing DMA functions, and permitting dramatic increases in the volume of work available from the processor, without requiring significant system circuitry for performing the DMA function so as to minimize both the size and cost burden of this function.

Another problem in performing DMA functions is that memory buffers are typically of a fixed size, while data coming in from various packetized data channels, such as Ethernet or HDLC, can be of variable length. Normally the buffer length in the memory for receiving such variable length packetized data has to be large enough to receive the largest packets, which packets may be many times the size of the smallest packets transmitted, for example, 8 to 16 times the size of the smallest packets. This means that significant memory space is generally wasted when variable length packetized data is transferred into memory and that far more memory space must be allocated to receiving such data that would be the case if such variable length data where more efficiently stored. However, the housekeeping burden in more efficiently storing such variable length data has heretofore been such that, in most applications, no effort is made to more efficiently store such data. In the rare situations where such efforts are made, the added processing burden involved in doing such transfers further reduces processor availability for performing other functions.

A need therefore also exists for a DMA controller which facilitates the more efficient storage of variable length packetized data in system memory without requiring substantial processing, and in particular, with little if any added processing burden on the system processor.

SUMMARY OF THE INVENTION

In accordance with the above, this invention provides an access controller for a computer system memory, at least portions of which are accessible through a plurality of channels. The controller includes a context memory storing information relating to the current state of each channel, a component utilizing context memory information for a channel to control a memory access for the channel, at least a portion of such component being time shared by the channels, and a channel arbiter which selects the channel for which the component provides access control at a given time. The channel selection by the arbiter is preferably based on priorities for each channel stored in the context memory in a selected arbitration algorithm. The arbiter may scan the channels in a selected sequence each time channel selection is performed, highest priority channels being included in each scan, and channels having successively lower priorities being scanned at successively longer intervals, a channel being moved to the bottom of the scanned sequence after being selected by the channel arbiter.

The context memory may include a context buffer containing selected information on each required access transaction for each channel. The context buffer may contain a buffer descriptor for each access transaction, the descriptor containing a starting address indicator in system memory for the transaction, and a length indicator for data involved in the access transaction. Each buffer descriptor may also include a status indication for the access to which the descriptor relates and may also include at least one bit indicating that the buffer descriptor is the last descriptor of a selected group of descriptors. Such bit may for example include a wrap bit, the component performing accesses for a channel based on successive buffer descriptors until access is performed for a descriptor for which a wrap bit is present, the component returning to an initial buffer descriptor for the channel after an access involving the wrap bit-containing descriptor. Each buffer descriptor may also include a full bit (F-bit) which is set when the corresponding buffer is fill, the component not attempting to perform a read access to a buffer for which the F-bit is not set or a write access to a buffer for which the F-bit is set. Finally, each buffer descriptor may include an interrupt or I-bit, the controller issuing an interrupt to a system CPU after completion of an access transaction for which the corresponding descriptor has the I-bit present.

The context memory may also include configuration registers for each channel. One of the configuration registers for each channel may identify the start address for the buffer descriptors for the corresponding channel, and another of the configuration registers may be a control register having fields which control various functions. In particular, the control register may contain a priority field, the priority indicated by the priority field being a factor in channel selection by the channel arbiter, a field indicating a mode of memory access to be performed by the channel, a field indicating a quantity of data to be transferred for the channel during each memory access, and a field indicating an offset address for an active channel buffer descriptor from a buffer descriptor start address for the channel.

At least one of the channels may be for transferring data in at least one direction between a memory and a peripheral through a serial port, and at least one of the channels may be for transferring data in at least one direction between memory and a peripheral through a parallel port. The component may include a serial module and/or a parallel module, data to be transferred passing through the module and the module performing at least one of (a) buffering data passing therethrough, and (b) reformatting the data to be compatible with a format protocol for the memory/peripheral receiving an output from the module. At least one of the channels may be for transferring packetized data in at least one direction between a memory and a packetized data source through a packetized data port. The component may also include a packetized data module through which the data to be transferred passes, which module also performs at least one of (a) buffering data passing through the module, and (b) reformatting the data to be compatible with a format protocol for the memory/packetized data source receiving the output from the module. Where the data packets from the packetized data source are of variable length, the channel for transferring data packets from the packetized data source to memory may be divided into end channels, where n is an integer greater than 1, each of the end channels being for memory buffers of different size, the one of the end channels used for a transfer of a received data packet being the channel having the smallest available buffer in which the received data packet will fit.

Each of the channels is for memory access in one direction between a memory and a second element, the component including a first component which controls addressing and data transfer for memory access through the channel and at least one second component through which data passes for at least one channel during memory accesses for such channel, the second component performing at least one of (a) buffering data passing through the module, and (b) reformatting the data to be compatible with a format protocol for the memory/second element receiving an output from the second component. The second element may be a peripheral or may be another component of the system memory. In particular, at least one of the channels may be for transfer of data between a first memory and a second memory of the system memory. For such channel, the context memory may include an indication of a start address in one of the memories from which data to be transferred is read out and an indication of a start address in the other of the memories at which the data is to be written, and an indication of the quantity of data to be transferred. The component for such channel would include at least one first component for controlling the addressing of the memories and at least one second component for controlling data transfers for the memories. Finally, a holding register is provided for storing the data to be transferred between a read access to the one memory and a write access to the other memory.

The computer system preferably includes a bus through which transfers for the system memory pass, the component controlling at least selected data transfers through the bus. At least selected memory components of the system memory may be connected to transfer data with at least one other system component without passing through the bus, the control component providing controls for such transfers. The computer system may also include a main CPU which accesses the system memory through the bus and a second CPU which shares at least a portion of the system memory with the main CPU, the component controlling accesses to the portion of the memory system by the second CPU. Transfers of data may also be performed through the bus between an external device and system memory. The component may include a controller which normally interfaces with the context memory to control memory accesses and a module through which accesses are performned. Such module may include elements for passing data between the external device and system memory under control of the external device without substantial involvement of the controller normally controlling such accesses.

The invention also involves a method and apparatus for controlling the transfer of variable length packetized data (VLPD) from a VLPD source to a system memory, which method and apparatus include providing N channels through which the transfer of VLPD may be effected, where N is an integer greater than 1, each of the channels controlling transfers to buffers of a different size in the system memory; indicating the availability of a buffer to receive data through a suitable indicator for each channel; receiving an indication of the size of each VLPD to be transferred; utilizing the availability indicator and size indication to determine the channel for the smallest available buffer in which the VLPD to be transferred will fit; and utilizing the determined channel to store the VLPD in said smallest available buffer.

The foregoing and other objects, features and advantages of the invention will be apparent from the following more particular description of a preferred embodiment of the invention as illustrated in the accompanying drawing.

DETAILED DESCRIPTION

Figure 1:
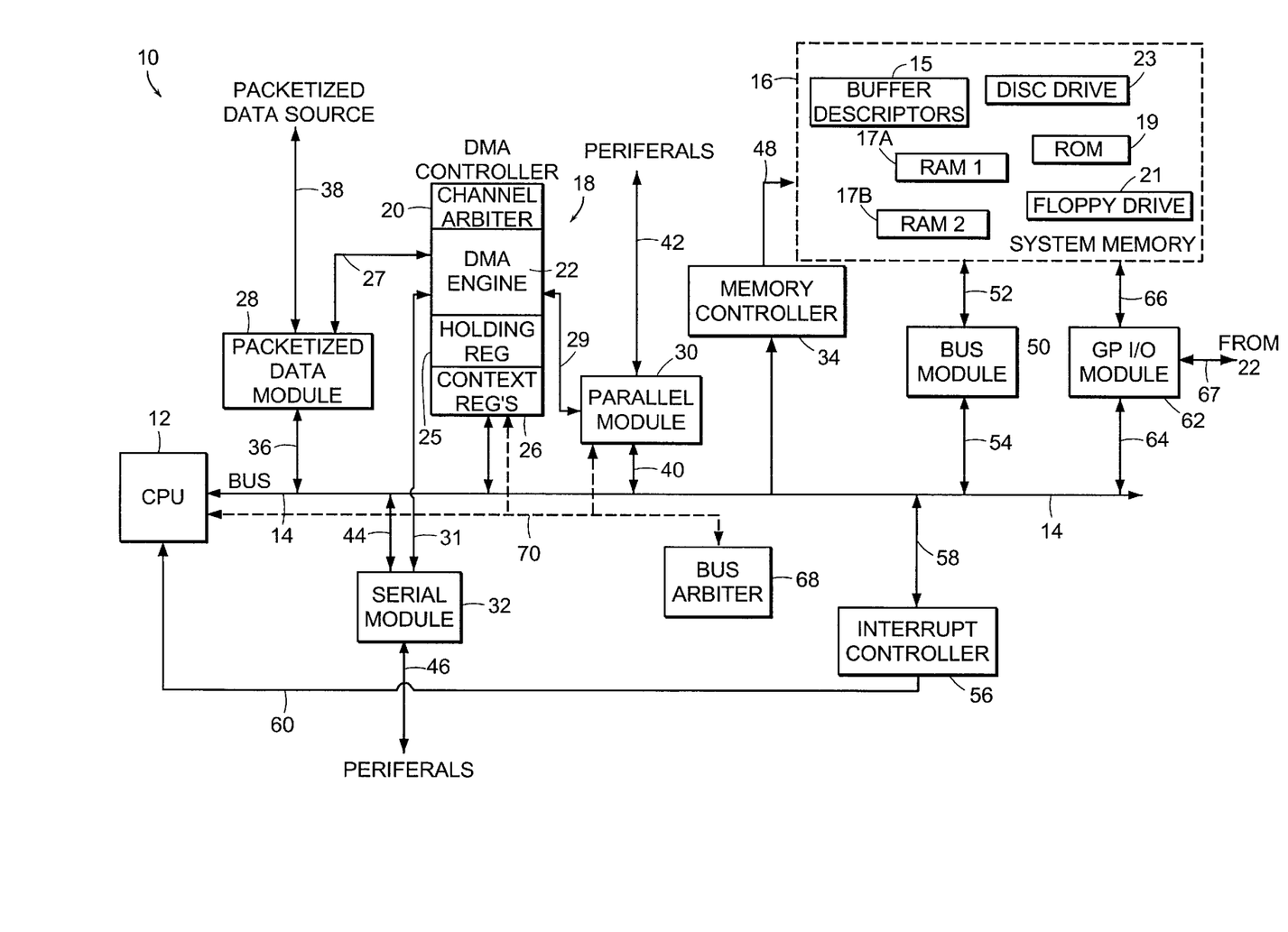
The FIGURE is a schematic block diagram of a memory access controller in accordance with the teachings of this invention.

Referring to the figure, system 10 includes a central processing unit (CPU) 12 having a main bus 14 over which data and instruction may be passed between the CPU and system memory 16 and/or various peripherals with which the CPU interfaces. For one embodiment of the invention, CPU 12 may contain internal cache memory which is serviced by a high speed bus, bus 14 interfacing with the CPU's high speed internal bus through a suitable buffer. Alternatively, information to be downloaded from one the components of system memory 16 to a cache memory within CPU 12 may be applied directly through bus 14.

System memory 16 may be made up of many components, exemplary ones of which are shown in the figure, including a buffer descriptors memory 15, random access memories (RAMs) 17A–17B, each of which may be of different size and or speed, a ROM 19, a floppy drive 21, a disk drive 23, etc. Buffer descriptors memory 15, the functions of which will be described later, may be a separate memory, but would typically be included as a section in one of the RAMs 17. Floppy disk drive 21, disk drive 23, a photo-disk drive or the like may each be part of the system memory, or may be a peripheral accessed in a manner to be described later.

A DMA controller 18 is provided which includes a channel arbiter 20, a DMA engine 22, a holding register 25 and a context registers 26. Each of these components of the DMA controller, including the function therefore, will be described in greater detail later. DMA engine 22 is connected over handshake lines 27, 29, 31 to a packetized data module 28, a parallel module 30, and a serial module 32, respectively, control signals being sent in both directions over the handshake lines. The various components of DMA controller 18 also communicate with each other and with bus 14.

Packetized data module 28 is a specialized module for buffering and reformatting data to be exchanged between one or more of an Ethernet port, HDLC port, token ring port and/or other packetized data source (PDS) and system 10. Information/data may pass from bus 14, through lines 36, module 28 and lines 38 to the PDS, or may pass through lines 38, module 28 and lines 36 from the PDS to bus 14, such transfers in both instances being under the control of DMA controller 18. Typically one channel is used for data received from the PDS and another channel is used for data transmitted to the PDS. However, as will be discussed later, where the PDS is a variable length PDS as opposed to a fixed length PDS, the receive channel from the PDS may be broken up into a plurality of channels to facilitate more efficient transfer of data from the PDS to the system memory.

Parallel module 30 is utilized for exchanging data with various peripherals which peripherals may, for example, be receive only output devices such as a printer, controller for a display monitor, audio output device or the like. While such peripheral devices may send certain error or control data back to system 10, such data does not generally warrant a separate channel, and may be transmitted directly to CPU 12, to controller 18 or to some other suitable control device. Thus, while data lines 40 between bus 14 and parallel module 30, and data lines 42 between parallel module 30 and the peripheral(s) are shown as bidirectional in the figure, for applications where the peripheral is only an output device, parallel module 30 might service only a single channel sending data from bus 14 to the peripheral. However, a single parallel module 30 might be utilized to service a number of different channels, each of which either interfaces with a different peripheral and/or is used to control the transfer of data with such peripheral in a different direction. For each of the channels serviced by parallel module 30, the module performs a variety of functions, including buffering data being transferred, generally on a FIFO basis, to account for differing data rates between the bus and the peripheral, and reformatting data applied to the module to be consistent with the format protocol for the device at the output from the module. Thus, data formatted for system 10 on bus 14 would be reformatted to the format protocol of the peripheral for data transmitted to the peripheral and data received from the peripheral at module 30 would be reformatted to the format protocol of system 10 when being received from the peripheral.

Serial module 32 is similar to parallel module 30, being bidirectionally connected to bus 14 by lines 44 and bidirectionally connected to appropriate peripherals through lines 46. Module 32 also performs buffering and format matching functions for appropriate peripherals/ports which may, for example, be a special purpose processor or other processor interfaced to system 10, may be some form of large capacity memory such as a disk drive 23 connected as a peripheral rather than as part of system memory 16, or might be a modem or other appropriate peripheral.

Addressing and other control inputs to system memory 16 are applied to the system memory from memory controller 34 over lines 48, while data from bus 14 is transferred to and from system memory through bus module 50 over lines 52 connecting the bus module to system memory 16 and lines 54 connecting the bus module to bus 14. Memory controller 34 may receive addressing and other control inputs over bus 14 from at least CPU 12 and DMA controller 18. Bus module 50, to the extent required, reformats data applied to module 50 for storage in a memory component 15–23 or for application to bus 14. While for the illustrative embodiment all required buffering is done in modules 28, 30 and 32, in an appropriate application, bus module 50 might provide a buffering function as required to match the data rate on bus 14 to that of the memory component 15–23 being accessed for a given operation. Data on bus 14 applied to a component of system memory 16 may originate from CPU 12, including a cache memory therein, from a packetized data source or from a peripheral connected through parallel module 30 or serial module 32, and data outputted from a component of system memory 16 through bus module 50 may be applied to the CPU, a PDS or any of the other peripherals connected to a parallel or serial module. The data on bus 14 may also pass to holding register 25 or be received from the holding register for memory-to-memory mode.

An interrupt controller 56 is connected to bus 14 through lines 58 and applies interrupts to CPU 12 through line 60. System 10 generates interrupts to CPU 12 to advise the CPU that a particular job has been complete and under other condition to be hereinafter described, interrupt controller 56 receiving information generally from DMA controller 18 relating to a particular data transfer operation and generating an interrupt to CPU 12 when conditions appropriate for an interrupt are detected.

A general purpose (GP) I/O module 62 is also connected to bus 14 through bidirectional lines 64 and to a peripheral or other external device interfacing with the system or some portion thereof through lines 66. The specific functions of module 62 will be discussed later.

Finally, the system includes a bus arbiter 68 which is connected bidirectionally to various components requiring access to bus 14 through lines 70. For purposes of illustration in the Figure, these components include CPU 12, DMA controller 18 and parallel module 30, which may in a particular mode of operation require access to the bus independent of DMA controller 18. Components requiring access to bus 14 are assigned a priority for arbitration in arbiter 68 and provide an indication to the arbiter through the appropriate line or lines 70 when they require access to the bus. Arbiter 68 looks at the components requiring access to the bus in a predetermined order and assigns access during a given time interval based on an arbitration algorithm generally hardwired therein. For example, a higher priority component may be looked at for each arbitration performed by arbiter 68, while a lower priority component may be included in every other arbitration, in every third arbitration, etc. When a component gains access to the bus, it may move to the bottom of the list for subsequent arbitrations. Other arbitration algorithms, including algorithms known in the art, might also be used by bus arbiter 68.

DMA controller 18, modules 28, 30, 32, 50, and 62, controllers 34 and 56 and arbiter 68 are, for a preferred embodiment of the invention, either hardware or firmware devices dedicated to performing the specific function. This is considered advantageous for the application in that it minimizes the amount of hardware required and permits higher speed operation than is possible if these functions are performed by a microprocessor or other programmed general purpose processor. However, the performance of functions by these various components of the system by hardware or firmware is not a limitation on the invention, and in a suitable application, the functions of one or more of the modules/controllers/arbiters shown in the Figure may be performed by a suitable programmable processor or by a hybrid of hardware and software. Further, while separate modules/controllers, etc. are shown in the Figure for performing each of the functions, this is also not a limitation on the invention, and a single controller/module, etc. may, in appropriate applications, be utilized to perform two or more of the indicated functions.

There is an area in buffer descriptors 15 for each channel, which area contains a listing of successive memory transfers for the channel. Such memory transfers may be of two general types, namely fly-by mode and memory-to-memory mode. In fly-by mode, data is transferred between a peripheral and a memory of system memory 16 through the appropriate module 28, 30, or 32 and through bus module 50 under control of DMA controller 18, but the data never resides in the controller. By contrast, in memory-to-memory mode, data is read from one of the memories 15–23, and stored in holding register 24 of the DMA controller during a first access cycle and is then read out from the holding register and stored in the same or a different memory component during a second write access. Memory-to-memory could also be used for loading data from a memory of system memory 16 to a cache memory in CPU 12 or for downloading data from the cache memory to system memory 16;however, for a preferred embodiment, this data is stored in a buffer between bus 14 and an internal bus of CPU 12 and is uploaded or downloaded to from this buffer under control of a cache controller in the CPU. Arbiter 68 determines when the cache controller is granted access to bus 14 to upload or download information for the cache controller buffer. The cache controller or other portion of the CPU provides addressing inputs through bus 14 to memory controller 34 to control the component and address in memory system 16 from which data is read out or in which data is stored and the volume of data to be transferred in a given cycle, the data being transferred between bus 14 and system memory 16 through bus module 50. Since buffering is done in the cache controller of CPU 12, no buffering is required in bus module 50 for this operation. To the extent required, bus module 50 reformats data transferred therethrough to be compatible with the format protocol for the cache memory/system memory component receiving the data being transferred.

Table 1A shows a single fly-by mode buffer descriptor (for example as sorted in buffer descriptors 15) for an illustrative embodiment of the invention, while Table 1B shows a single buffer descriptor for the same illustrative embodiment for memory-to-memory mode. From these tables, it is seen that the buffer descriptor in the illustrative embodiment requires two 32-bit words for fly-by mode, while the buffer descriptor for memory-to-memory mode requires four 32-bit words, only three of which are use. Thus, assuming for example that there are 128 fly-by buffer descriptors possible for each channel, the buffer descriptors would contain only 64 memory-to-memory descriptors.

TABLE 1A

Buffer Descriptor (Fly-By Mode)

| 31 | 30 | 29 | 28 | 16 15 | 0 |
|----|----|----|----|-------|---|
| W  | I  | L  |    | Buffer Pointer | |
|    |    | Status |  | F | Buffer Length |

TABLE 1B

Buffer Descriptor (Memory-to-Memory Mode)

| 31 | 30 | 29 | 28 | 16 15 | 0 |
|----|----|----|----|-------|---|
| W  | I  | L  |    | Source Buffer Pointer | |
|    |    | Status |  | F | Buffer Length |
|    |    | Destination Buffer Pointer | | | |
|    |    | Reserved | | | |

Referring to Table 1A, it is seen that the first word of the buffer descriptor contains a W/wrap bit, an I/interrupt bit and an L/last bit, and also contains a buffer pointer to the address in the appropriate memory, generally a RAM 17, where storage of data being read into the memory from a peripheral is to be stored or where data to be transmitted to a peripheral is to be read out. The second word contains a status field, an F/full bit and a buffer length field. Referring Table 1B it is seen that the first word also contains the W, I and L bits and also contains a source buffer pointer field which contains the starting address of the data to be read out for the memory-to-memory transfer. The second word is the same as the second word of the fly-by mode descriptor, namely a status field, F bit and buffer length field, while the third word contains a destination buffer pointer field containing the starting address in for example a memory 17 at which the data is to be written during the second cycle of the memory-to-memory transfer. The fourth word is reserved for future use in the illustrative embodiment.

In the buffer descriptors, the W, I, L and F bits have the following significance:

W—The "wrap" bit, when set, informs DMA controller 18 that this is the last buffer descriptor within a continuous list of descriptors. When the wrap bit is not set, the next buffer descriptor is found using an offset (+8 for fly-by mode and +16 for memory-to-memory mode for the illustrative embodiment) from the current buffer descriptor. When the W bit is set, the next buffer descriptor is the buffer descriptor at the start address of buffer descriptors for the given channel, this address being obtained from a pointer to be described later.

I—The "interrupt" bit, when set, informs the DMA controller to issue an interrupt through interrupt controller 56 to CPU 12 when the access operation indicated by the descriptor has been normally completed. As will be discussed in greater detail later, this interrupt will occur regardless of any normal interrupt configuration for the given channel.

L—The "last" bit, when set, informs the DMA controller that the buffer descriptor is the last descriptor of a message frame. Since message frames may be much larger than the capacity of buffer descriptors 15 for a given channel, buffer descriptors 15 may be loaded and processed several times before and L bit is found, and an L bit may appear in the middle of a sequence of descriptors for a given channel, meaning that a given frame has been completed and that subsequent descriptors involve a different message or Fame. Thus, the W bit and L bit are independent. The DMA controller uses the L bit to signal the peripheral. The L bit is particularly useful when multiple descriptors are chained together to constitute a data frame.

F—The "full" bit, when set, indicates that the corresponding buffer is full, or in other words that there is data at the address indicated by the corresponding buffer pointer. DMA controller 18, and in particular DMA engine 22 thereof, sets this bit when it loads data into a buffer and clears this bit after emptying a buffer. DMA controller 18 will not attempt to empty a buffer for which the F bit is clear (i. e., not set) and will not attempt to fill a buffer for which the F bit is set. In neither case, the controller will wait for appropriate action to be taken with respect to this bit. For memory-to-memory operation, the F bit in the second word as illustrated in Table 1B indicates that the buffer at the address indicated by the source buffer pointer is full and that the buffer at the address indicated by the destination pointer is empty. A "0" in the F bit field has the opposite significance. For an alternative embodiment, Table 1B may have an F bit in both word, which applies only to the status of the source buffer, and a separate F bit in for example word 3 which applies only to the status of the destination buffer.

The buffer pointer for fly-by mode must be aligned with a bit boundary determined by the peripheral device being serviced by the channel, for example a 32-bit boundary, for peripheral-to-memory operation, but can start at any byte boundary for fly-by memory-to-peripheral operation. For memory-to-memory operation, the only requirement is that the source buffer pointer and destination buffer pointer start at the same byte boundary.

The status field is used by various ones at the controllers, including at least the packetized data module 28 and the serial module 32, to store transmit and receive status words as a result of a completed transmit or receive data frame. For an illustrative embodiment, the status word is a function of the peripheral used for the channel and is provided by the peripheral. This information can be used for diagnostic and other purposes.

The buffer length field is used in fly-by peripheral-to-memory operations to indicate the maximum number of bytes available in the receive buffer pointed to by the buffer pointer. After filling a receive buffer with peripheral data, DMA controller 18 will update this field with the actual data byte count stored in the memory. DMA controller 18 can use this count and information received from the peripheral as to the length of message sent to verify transmission and receipt of the full message and to provide an appropriate error indication if data has been lost in the transmission. The buffer length field is used in fly-by memory to peripheral operations to indicate the number of bytes to move from the buffer indicated by the buffer pointer to the peripheral device. After completing a transmit operation, the DMA controller updates this field with the actual data byte count for the transfer. This information in each instance can be useful for diagnostics during error conditions and for other purposes. Finally, the buffer length field is used in memory-to-memory operations to indicate the number of bytes to move between the buffer indicated by the source address pointer and the buffer indicated by the destination address pointer. After completion of memory-to-memory operation, the DMA controller updates this field with the remaining data byte count (i.e., the number of bytes which remain for transmittal due to a failure of transmission). For an illustrative embodiment, the buffer length field is 13 bits and is thus capable of indicating a data block of contiguous memory locations of from 1 byte to 32,768 bytes. Since, as will be discussed later, a single data transfer typically involves only 4 bytes for an illustrative embodiment, and will not exceed 16 bytes for this illustrative embodiment, it is possible for a single buffer descriptor to be used to control a large number of data transfers for a given channel.

Table 2 indicates the contents of the DMA context registers 26 for an exemplary embodiment having 10 channels, with channel 1 being broken up into four subchannels A–D, each of which is treated as a separate channel, as will be described in greater detail hereinafter.

The buffer descriptor pointer for each channel/subchannel is a register, for example a 32-bit register for an illustrative embodiment, which provides a pointer to the first buffer descriptor in the buffer descriptors 15 for the channel, these buffer descriptors, as previously indicated, being a contiguous list of descriptors. The buffer descriptor for each subchannel of channel 1, which channel for this embodiment is used for transferring from a variable length packetized data source to memory, contains a separate list of descriptors which identifies a block of data buffers of different size. In particular, the buffers supported by the subchannels are smallest for the A channel, for example being 64 bytes, and increase in size for each succeeding subchannel, being for example 1520 bytes for subchannel D. As will be described later, this feature allows DMA controller 18 to choose the most optimum buffer size for an incoming data packet.

TABLE 2

| Context Registers | |
|---|---|
| Address | Register |
| FF90 0000 | DMA 1 "A" Buffer Descriptor Pointer |
| FF90 0010 | DMA 1 "A" Control Register |
| FF90 0014 | DMA 1 "A" Status Register |
| FF90 0020 | DMA 1 "B" Buffer Descriptor Pointer |
| FF90 0030 | DMA 1 "B" Control Register |
| FF90 0034 | DMA 1 "B" Status Register |
| FF90 0040 | DMA 1 "C" Buffer Descriptor Pointer |
| FF90 0050 | DMA 1 "C" Control Register |
| FF90 0054 | DMA 1 "C" Status Register |
| FF90 0060 | DMA 1 "D" Buffer Descriptor Pointer |
| FF90 0070 | DMA 1 "D" Control Register |
| FF90 0074 | DMA 1 "D" Status Register |
| FF90 0080 | DMA 2 Buffer Descriptor Pointer |
| FF90 0090 | DMA 2 Control Register |
| FF90 0094 | DMA 2 Status Register |
| FF90 00A0 | DMA 3 Buffer Descriptor Pointer |
| FF90 00B0 | DMA 3 Control Register |
| FF90 00B4 | DMA 3 Status Register |
| FF90 00C0 | DMA 4 Buffer Descriptor Pointer |
| FF90 00D0 | DMA 4 Control Register |
| FF90 00D4 | DMA 4 Status Register |
| FF90 00E0 | DMA 5 Buffer Descriptor Pointer |
| FF90 00F0 | DMA 5 Control Register |
| FF90 00F4 | DMA 5 Status Register |
| FF90 0100 | DMA 6 Buffer Descriptor Pointer |
| FF90 0110 | DMA 6 Control Register |
| FF90 0114 | DMA 6 Status Register |
| FF90 0120 | DMA 7 Buffer Descriptor Pointer |
| FF90 0130 | DMA 7 Control Register |
| FF90 0134 | DMA 7 Status Register |
| FF90 0140 | DMA 8 Buffer Descriptor Pointer |
| FF90 0150 | DMA 8 Control Register |
| FF90 0154 | DMA 8 Status Register |
| FF90 0160 | DMA 9 Buffer Descriptor Pointer |
| FF90 0170 | DMA 9 Control Register |
| FF90 0174 | DMA 9 Status Register |
| FF90 0180 | DMA 10 Buffer Descriptor Pointer |

TABLE 2-continued

Context Registers

| Address | Register |
| --- | --- |
| FF90 0190 | DMA 10 Control Register |
| FF90 0194 | DMA 10 Status Register |

Continuing in Table 2, it is seen that for each channel/subchannel, there is also a control register. Table 3 illustrates the contents of the control register, which is shown as a single 32-bit word, for an illustrative embodiment. The CPU Function column in this table indicates functions which CPU 12 can perform for each field.

TABLE 3

Control Register

| Bit | CPU Functions | Name | Function |
| --- | --- | --- | --- |
| D31 | R/W | CE | DMA Channel Enable |
| D30 | W | CA | Channel Abort Request |
| D29:28 | R/W | BB | Bus Bandwidth Field<br>00: 100%; no limit<br>01: 75%<br>10: 50%<br>11: 25% |
| D27:26 | R/W | MODE | DMA Operation Mode<br>00: Fly-by Write; from Peripheral to Memory<br>01: Fly-by Read; from Memory to Peripheral<br>10: Memory-to-memory; Source to Destination<br>11: Reserved |
| D25:24 | R/W | BTE | Burst Transfer Enable<br>00: No Burst<br>01: 8-byte burst<br>10: 16-byte burst<br>11: Reserved |
| D23 | R/W | REQ | Channel Request Source (Used for Register mode channels only)<br>0: Internal Request<br>1: External Source |
| D22 | | | Reserved |
| D21 | R/W | SINC* | Source Address Increment<br>0: Increment Source Address Pointer<br>1: Do not increment Source Address Pointer |
| D20 | R/W | DINC* | Destination Address Increment<br>0: Increment Destination Address Pointer<br>1: Do not increment Destination Address Pointer |
| D19:18 | | | Reserved |
| D17:16 | R/W | SIZE | Data Operand Size<br>00: 32-bit<br>01: 16-bit<br>10: 8-bit<br>11: Reserved |
| D15:10 | R | STATE | Current DMA Channel State |
| D09:00 | R | INDEX | Current DMA Channel Buffer Descriptor index (in bytes) |

Referring to this Table, it is seen that bit 31 is a channel enable (CE) bit which is set only after the other bits in the control register for the channel are set. If this bit is not set for a channel, then memory accesses through such channel are inhibited until such time as the channel enable bit is set. Since the system can operate with less than all of the subchannels of channel 1, for example where it is known that variations in packet size from the variable length packetized data source will be restricted, only three, two, or even one of the subchannels may be used. In this case, the CE bit for the unused subchannels would not be set.

Bit 30 is a channel abort (CA) bit which, when set, causes the memory transfer operation in progress to be completed, and then causes operation for the channel to be closed or terminated. The CA bit is not automatically cleared after the requested abort is completed. This bit would be set by the DMA controller or an appropriate module when some error condition is detected involving the data transfer through the channel, for example a parity check problem or problem at the peripheral. This bit can only be reset by the DMA controller in response to a determination that the problem resulting in the setting of the bit has been overcome.

Two bits, bits 28 and 29, are used for a bus bandwidth (BB) field, this field indicating the priority for the corresponding channel. As will be discussed in greater detail later, this field determines how often the channel participates in arbitration for access to bus 14 and for use of is DMA controller 18. In particular, when these bits are 00, the channel participates in all access arbitrations, when the field is 01 the channel participates in three out of four such arbitrations, when the field is 10 the channel participates in half the arbitrations, and when the field is 11 the channel participates in only one out of four arbitrations.

The next two bits, bits 26 and 27, are the operation mode (MODE) field, these bits being set to 00 indicating that the channel is a fly-by write channel (i.e., peripheral to memory channel), a 01 setting indicating that the channel is a fly-by read channel (i.e., memory to peripheral channel), and a 10 indicating that the channel is a memory-to-memory channel. A 11 setting is currently reserved, but not used for a preferred embodiment.

The next two bits, bits 24 and 25, are a burst transfer enable (BTE) field. Burst transfer mode is useful in that it permits system 10 to better match the speed of a peripheral being serviced by a given channel. Ordinarily, a single access operation is performed per cycle, which results in the transfer of four bytes through the channel. However, for higher speed peripherals, this field permits two operations to be performed per access cycle, resulting in an eight byte burst being transferred for a given access, or for four operations to be performed per access cycle, resulting in a 16-byte burst being transferred. The 11 configuration is not used for the illustrative example shown. However, these burst sizes and numbers are not a limitation on the invention, and appropriate burst sizes may be utilized for a given application. For channel 1 of the illustrative embodiment, which has four subchannels A–D, the BB, mode and BTE settings in the control registers for all four subchannels should be identical.

The next bit, is a channel request source (REQ) bit which is used for certain specialized channels which may be accessed through one of the serial or parallel ports shown in FIG. 1 (an internal request), or may be connected to an external port in a manner to be described later to permit another processor or other device to share one or more components of system memory 16, or a selected portion of a memory component, with CPU 12 under general control of such external device.

The next two bits, bits 20 and 21, are a source address increment (SINC) bit and a destination address increment (DINC) bit, respectively. These bits control whether the source and/or destination address pointers respectively are incremented after each data transfer. If one of these bits is a 1, incrementing does not occur and, for example if the SINC bit is set, the same data is transmitted over and over for the channel.

The next two bits are a data operand size (SIZE) field which is used when the REQ bit is set or when the channel is in memory-to-memory mode to define the size of a transfer operation. Thus, while for the illustrative embodiment 4 bytes are normally transferred for fly-by mode in either direction between a peripheral and a component of system memory 16, for the register or shared memory mode and for memory-to-memory transfers, neither this limitation nor the burst mode previously discussed apply, and the SIZE field indicates whether a single 8-bit byte, 2 8-bit bytes, or 4 8-bit bytes are transferred during each transfer operation, these sizes being for the illustrative embodiment, and not a limitation on the invention. The actual number of bytes transferred during each transfer operation is a function of a number of factors, including application.

The next field is a current channel state field which indicates the current state for the channel. For an illustrative embodiment, this is a 5-bit field with various bit combinations indicating that the channel is "idle" (i.e., there is nothing for the channel currently to do, that the channel is to be used for a read operation, that the channel is to be used for a write operation, that the channel is to be used for a memory-to-memory transfer operation, that the channel is in the middle of doing a transfer between a peripheral and memory, that the channel is in the process of doing a memory-to-memory transfer, and/or that the channel has completed a transfer operation. Other status indications are possible in an appropriate application. This status information is useful for example for diagnostic and debugging purposes.

The last field is a current channel buffer descriptor index field and is used to indicate the offset in bytes of the buffer descriptor in buffer descriptors 18 for the channel from the address indicated by the buffer descriptor pointer (Table 2) for the channel. This field is indexed each time an access operation for the channel under control of a descriptor is completed and is reset to "0" when access operations for a channel descriptor having a W bit set is completed.

The last register for each channel/subchannel of the context registers in Table 2 is a status register which also functions as an interrupt enable register. Table 4 illustrates the functions for each bit of a 32-bit word contained in this register for an illustrative embodiment of the invention, a "C" in CPU Function column indicating that the CPU can also clear this field. Bits 28–31 are interrupt pending (IP) bits for four different conditions, while bits 20–23 are interrupt enable (IE) bits for the same conditions. An IE bit being set causes an interrupt to occur when the corresponding IP bit is set in the register. The IP bits are set to indicate that an interrupt should be performed. For an illustrative embodiment, a bit is set by writing a "0" at the bit location and is cleared by writing a "1" to the location.

TABLE 4

Status/Interrupt Enable Registers

| Bit | CPU Function | Name | Function |
| --- | --- | --- | --- |
| D31 | R/C | NCTP | Normal Completion Interrupt Pending |
| D30 | R/C | ECIP | Error Completion Interrupt Pending |
| D29 | R/C | NRIP | Buffer Not Ready Interrupt Pending |
| D28 | R/C | CAIP | Channel Abort Interrupt Pending |
| D27:24 | | | Reserved |
| D23 | R/W | NCIE | Normal Completion Interrupt Enable |
| D22 | R/W | ECIE | Error Completion Interrupt Enable |
| D21 | R/W | NRIB | Buffer Not Ready Interrupt Enable |
| D20 | R/W | CAIE | Channel Abort interrupt Enable |
| D19 | R | WRAP | Identifies last Descriptor in List of Descriptors |
| D18 | R | IDONE | Interrupt on Done |
| D17 | R | LAST | Last Buffer Descriptor in current data frame |
| D16 | R | FULL | Buffer Full indicator |
| D15 | | | Reserved |
| D14:0 | R | BLEN | Remaining Byte Transfer Count |

More specifically, the NCIP bit (bit 31) is set when a buffer descriptor (see buffer descriptors 15 in the Figure) is closed (for normal conditions), and either the NCIE bit is set or the IDONE bit (bit 18) is found active in the status register. A normal channel completion occurs when the BLEN count (bits 0–14) expires or goes to "0", this count being indicative of the bytes remaining to be transferred for a given operation, or when a peripheral signals completion of a peripheral to memory fly-by transfer. This interrupt is required to inform CPU 12 that the requested transfer has been completed. If this bit is not set, then an interrupt occurs on the closing of a buffer descriptor only when the 1 bit in the buffer descriptor is set.

The ECIP bit is set when the DMA controller 18 encounters either a bad buffer descriptor pointer in the control register or a bad buffer pointer in a buffer descriptor 15. When the ECIP bit is set, DMA engine 22 will stop processing for the channel until the condition is corrected, either by an operator or by CPU 12, and the ECIP bit is cleared, preferably by hardware or firmware of the DMA controller. Until the ECIP bit is cleared, the DMA controller 18 will not advance to the next buffer descriptor. When the ECIP bit is cleared, the buffer descriptor will be retried from where it left off. A CA bit present in for example bit 31 of the control register for the channel can be recognized by controller hardware, firmware or software to abort the current buffer descriptor and advance to the next descriptor.

The NRIP bit, bit 29, is set when the DMA controller 18 encounters a buffer descriptor whose "F" bit is in the incorrect state. When the NRIP bit is set, the channel control will stop and will not advance to the next buffer descriptor until the situation is corrected and the NRIP bit is cleared by the DMA controller 18. When the NRIP bit is cleared, the buffer descriptor is retried.

The CAIP bit is set when the DMA engine 22 detects that the CA bit for the channel is set in the corresponding control register. When the CAIP bit is set, the channel controller will stop until this bit is cleared by DMA controller 18, and the controller will automatically advance to the next buffer descriptor after the CAIP bit is cleared. The CA bit in the corresponding control register must be cleared, generally by CPU 12, before the CAIP bit can be cleared. Failure to reset the CA bit will cause the subsequent buffer descriptor to also abort. As indicated above, the NCIE, ECIE, NRIE and CAIE bits are used to enable interrupts to be generated when the corresponding IP bits (i.e., bits 28–31) are set. Generally, the NCIE bit will be used for inbound (write) operations while the IDONE bit is used for outbound (read or transmit) operations. The ECIE, NRIE and CAIE bits should always be enabled. The WRAP, IDONE, LAST, FULL and BLEN status bits function primarily for diagnostic or debugging purposes, the WRAP, LAST, and FULL bits being set to correspond with the settings for the corresponding W, L and F bits in the current buffer descriptor 15 for the channel. These bits would be identical for subchannels A–D of channel 1.

In operation, CPU 12 loads appropriate descriptors into buffer descriptors 15 indicating the need for an access operation, or more normally a number of access operations, to transfer data in a particular direction between a peripheral and a component of system memory 16, or between various components of the system memory. The loading of the buffer descriptors may be initiated by CPU 12 or may be initiated by a peripheral sending a handshake signal through its corresponding module 28, 30, 32 either directly to the CPU through bus 14 or preferably through DMA engine 22 to the CPU advising that the peripheral has data to transmit. The CPU will then determine where such data is to be stored and generate the appropriate buffer descriptor(s). At the same time the buffer descriptors are loaded into buffers 15, CPU 12 also informs the DMA controller, and in particular channel arbiter 20 thereof that data access operations are required for the given channel and makes any necessary entries in the control register (Table 3) and/or status register (Table 4) for the channel. The CE bit is set when the channel has been fully configured.

It will initially be assumed that bus arbiter 68 has granted access to DMA controller 18 and that the channels are initially in some order for channel arbiter 20, which order may be based on priority or some other criteria, but is typically based on channel number. The channel arbiter makes an arbitration decision each time access to bus 14 is granted to DMA controller 18 by bus arbiter 68. In making this decision, channel arbiter 20 looks at which channel has data which is either to be transmitted to a peripheral, received from a peripheral or transferred between memories, which of these channels are ready to perform a transfer operation (i.e, have their channel enable (CE) bit set indicating that they are fully configured), what is the channel priority as indicated by the control register BB field for the channel, and which channels were looked at during the previous arbitrations. The arbiter uses this information to determine which channels are included in a given arbitration and the order in which the channels are looked at. The channels looked at during each cycle are the channels which have data to transmit, are fully configured for the transmission and which, in accordance with their priority, are to be looked at during this arbitration. As previously indicated, for a 100 percent channel, this would be every arbitration; for a 75 percent channel, it would be looked at for three consecutive arbitrations and then not included in the fourth arbitration; for a 50 percent channel, it would be included if the channel was not included on the prior arbitration, while for a 25 percent channel, it would be included if it had not been included on the prior three arbitrations. While as indicated earlier the initial order in which the channels are looked at is not critical, for an illustrative embodiment, once a channel wins an arbitration, it moves to the bottom of the list for subsequent arbitrations.

When, during an access arbitration, arbiter 20 assigns DMA engine 22 to servicing a selected channel, then the DMA engine provides handshake or enable signals to the appropriate module 28, 30, 32 to enable transfer in the appropriate direction between memory and the peripheral for the channel through the corresponding module. The DMA controller, and in particular DMA engine 22 thereof, also sends address and control signals through memory controller 34 to the appropriate component of system memory 16. If the access is to be a fly-by memory to peripheral access, the address and control signals applied through controller 34 cause data indicated by the buffer descriptor for the channel currently being accessed to be read out through bus module 50 and bus 14 to the appropriate module 28, 30, 32 where this data is buffered, and to the extent required reformatted, before being transferred to the peripheral from the buffer at a rate appropriate for the peripheral. The number of bytes transferred will be either fixed, for example always 4 bytes for an illustrative embodiment, or may be variable to better match the data rate of the peripheral, the number of bytes being transferred during a given transfer being controlled by DMA engine 22 based on the contents of for example the BTE field of a control register (Table 3). Where the number of bytes transferred during a given transfer is less than all the bytes for the transfer control by the buffer descriptor for the channel, the next time access is granted to the channel, the transfer under control of the buffer descriptor will continue, with read out or write beginning at the byte address following that at which the last transfer was completed. For memory-to-memory mode, the memory access in response to the first two words of the buffer descriptor of Table 1B results in data of the length indicated by the SIZE field of the control register (Table 3), starting at the source buffer pointer, being read out and passed through bus module 50 and bus 14 to be stored in holding register 25. During the second cycle of this transfer, the contents of holding register 25 are read out through bus 14 and bus module 50 to be stored under control of address signals provided through memory controller 34 in system memory at the address in the appropriate memory component indicated by the destination buffer pointer of Table 1B. For the illustrative embodiment, the formatting for all memory components of the system memory 16 are the same, so that no reformatting is required for a memory-to-memory operation. However, should the system memory 16 for a particular application contain memory components having different formats, module 50 could be designed with appropriate hardware, firmware, software, or some combination thereof to perform any required reformatting. It is also possible for the buffering functions of holding register 25 to be performed in module 50 or at another appropriate location in the system.

For fly-by mode, peripheral-to-memory, where fixed length data is being provided from the peripheral, the appropriate module is enabled by signals applied thereto from DMA engine 22 to receive and buffer the data being transferred and to reformat this data to the extent required. The DMA engine 22 then causes the data in the module buffer to be read out through bus 14 and bus module 50 to be stored in the appropriate component of system memory 16 at the address indicated in the buffer pointer field of the corresponding buffer descriptor under control of memory controller 34.

For an illustrative embodiment shown in the Tables, channel 1 is utilized to transfer variable length packetized data from for example an Ethernet source into system memory 16. Since, as indicated earlier, there can be nearly an order of magnitude difference in the size of the packets, if a fixed length memory buffer was always assigned to receive such variable length packetized data, the buffer would need to be of a size equal to the largest packet being transferred, resulting in an inefficient use of memory where smaller packets are being received. As indicated in the Tables, the solution to this problem is to divide channel 1 into four subchannels A–D, each of which controls access to a buffer of different size. For example, as indicated earlier, channel A might have buffers 64 bytes long, channel B buffers 128 bytes long, channel C buffers 512 bytes long, and channel D buffers 1520 bytes long. When an incoming packet is received at module 28, an attempt is made to store this packet in the smallest available buffer in which the packet will fit. In particular, during the handshake phase of the operation when the message is received, module 28 sends a message over lines 27 to DMA engine 22 advising it as to the size of the received packet. DMA engine 22 then compares the size of the received packet against the buffer size for channel A, channel B, channel C and channel D, stopping when it finds a subchannel having a buffer size sufficient to accommodate the received packet which buffer is determined by the DMA engine to not be full. If the first buffer in which the packet will fit is full, the packet is stored in the next larger buffer having available space. The search continues, from channel A to channel D (i.e., from small buffer to large buffer), stopping when a channel is found in which the packet can be stored. This assures that a packet will always be stored in the smallest available buffer in which it will fit.

In addition to operating in the ways previously discussed, one of the modules, for example parallel module 30 for the illustrative embodiment, may also operate in a shared memory mode permitting a CPU or other processor in addition to CPU 12 to have access to one or more components, for example one of the RAMs 17 of system memory 16. This memory component would thus be shared by the two processors. One of the two channels used for this mode of operation is used for transferring data into the shared memory, and the other channel is used for transferring information from the shared memory to the external CPU. While for this mode of operation the external CPU may send address and other control inputs through module 30 and line 29 to the DMA engine which would then control the transfer in ways previously discussed for fly-by transfers, for the illustrative embodiment, the DMA controller is not involved in these transfers and control information applied to module 30 is used directly to control the transfers. Thus, for this mode, arbiter 68 would grant module 30 access to bus 14 directly rather than as part of an access granted to DMA controller 18.

While for other applications module 30 has FIFO buffers, such buffers are normally only 4 bytes. However, for a register mode, which may also be run for example through module 30, an expanded FIFO of perhaps 32 bytes is used for each direction. The external CPU or other peripheral involved in such transfer also sends signals through module 30 and handshake lines 29 to DMA engine 22, permitting the DMA engine to control the filling and emptying of these FIFO buffers. Therefore, the external CPU/peripheral has minimal involvement in the process of memory access and can also be utilized to perform other functions while the DMA access is being done. Loading or emptying of the 32 byte buffers may be performed 4 bytes at a time over 8 cycles or may be performed in a burst mode over 2 or 4 access cycles.

The system may also be utilized to perform either memory-to-memory transfers or transfers between a peripheral and memory without data passing through bus 14 through use of the general purpose (GP) I/O module 62. For this mode of operation, there are direct data line connections between the memories to communicate in this mode and/or between the peripheral and memory to be communicating. Module 62 receives configuration information for this mode of operation from the DMA engine 22 or from CPU 12 over bus 14 and line 64 and receives handshake signals for controlling the transfer over line 67. In response to these inputs, module 62 sends signals over lines 66 to control the reading out of the data from the component which is a source of the data and the storing of the data at the component which is the destination for the transfer. Module 62 also receives information from the components over line 66 as to the status of the transfer, and handshake signals are sent over lines 67 to DMA engine to for example inform the DMA controller that the transfer has been completed.

Once a data transfer for a particular buffer descriptor has been completed, the channel for that descriptor moves to the bottom of the channel arbiter list, and the next time DMA controller 18 is granted access to bus 14, the channel arbiter again performs an access arbitration to determine the channel granted the next access. Since the hardware/firmware of the DMA controller 18 and of the various other modules and controllers of system 10 operate at much higher speed than any of the peripherals or memories being serviced, controller 18, and to a lesser extent various other ones of the modules and controllers, can be time shared among the multiple channels without difficulty. A system is thus provided which removes most of the burden of DMA operations from CPU 12, permitting more efficient use of the CPU to perform other operations, and thus significantly enhancing the throughput of the system, while not adding significantly to the cost and/or size of the overall system.

While the invention has been particularly shown and described above with reference to a preferred embodiment, and a number of variations on such embodiment have been discussed, it should be understood that this embodiment and the variations discussed are for purposes of illustrations only, and that other variations on the system are also possible. Thus, while the invention has been particularly shown and described above with reference to a preferred embodiment, the foregoing and other changes in form and detail may be made therein by one skilled in the art while still remaining within the spirit and scope of the invention, which is to be defined only by the following claims.

What is claimed is:

1. An access controller for a computer system memory, at least portions of which are accessible through a plurality of channels, including:

a context memory storing information relating to the current state of each channel, said context memory including a context buffer containing a buffer descriptor for each required access transaction for each channel, said descriptor containing a starting address indicator in system memory for the transaction a length indicator for data involved in the access transaction, and a wrap bit;

a component utilizing context memory information for a channel to control a memory access for the channel, at least a portion of said component being time shared by said channels, said component performing access for a channel based on successive buffer descriptors until access is performed for a descriptor for which a wrap bit is present, the component returning to an initial buffer descriptor for the channel after an access for the wrap-bit-containing descriptor; and a channel arbiter which selects the channel for which said component provides access control at a given time.

2. An access controller as claimed in claim 1 wherein each buffer descriptor includes at least one bit indicating that the buffer descriptor is the last descriptor of a selected group of descriptions.

3. An access controller for a computer system memory, at least portions of which are accessible through a plurality of channels, including:

a context memory storing information relating to the current state of each channel, said context memory including a context buffer containing a buffer descriptor for each required access transaction for each channel, said descriptor containing a starting address indicator in system memory for the transaction, a length indicator for data involved in the access transaction and a full bit (F-bit) which is set when the corresponding buffer is full;

a component utilizing context memory information for a channel to control a memory access for the channel, at least a portion of said component being time shared by said channels, the component not attempting to perform a read access to a buffer for which the F-bit is not set or a write access to a buffer for which the F-bit is set; and a channel arbiter which selects the channel for which said component provides access control at a given time.

4. An access controller for a computer system memory, at least portions of which are accessible through a plurality of channels, including:

a context memory storing information relating to the current state of each channel, said context memory including a context buffer containing a buffer descriptor for each required access transaction for each channel, said descriptor containing a starting address indicator in system memory for the transaction, a length indicator for data involved in the access transaction and an interrupt (I-bit);

a component utilizing context memory information for a channel to control a memory access for the channel, at least a portion of said component being time shared by said channels;

a CPU which issues access instructions to the access controller, the controller issuing an interrupt to the CPU after completion of an access transaction for which the corresponding descriptor has the I-bit present; and a channel arbiter which selects the channel for which said component provides access control at a given time.

5. An access controller for a computer system memory, at least portions of which are accessible through a plurality of channels, including:

a context memory storing information relating to the current state of each channel, said context memory including a context buffer containing selected information on each required access transaction for each channel and configuration registers for each channel, a component utilizing context memory information for a channel to control a memory access for the channel, at least a portion of said component being time shared by said channels; and a channel arbiter which selects the channel for which said component provides access control at a given time.

6. An access controller as claimed in claim 5 wherein one of said configuration registers for each channel identifies the start address for the buffer descriptors for the corresponding channel.

7. An access controller as claimed in claim 5 wherein one of said configuration registers for each channel is a control register having fields which control various functions.

8. An access controller as claimed in claim 7 wherein said control register contains a priority field, the priority indicated by said priority field being a factor in channel selection by said channel arbiter.

9. An access controller as claimed in claim 7 wherein said control register contains a field indicating a mode of memory access to be performed by the channel.

10. An access controller as claimed in claim 7 wherein said control register contains a field indicating a quantity of data to be transferred for the channel during each memory access.

11. An access controller as claimed in claim 7 wherein said control register contains a field indicating an offset address for an active channel buffer descriptor from a buffer descriptor start address for the channel.

12. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels; and a channel arbiter which selects the channel for which said component provides access control at a given time; and wherein at least one of said channels is for transferring data in at least one direction between a memory and a peripheral through a serial port, and including a serial module through which the data to be transferred passes, said module performing at least one of (a) buffering data passing through the module, and (b) reformatting the data to be compatible with a format protocol for the memory/peripheral receiving an output from the module.

13. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels; and a channel arbiter which selects the channel for which said component provides access control at a given time; and wherein at least one of said channels is for transferring data in at least one direction between a memory and a peripheral through a parallel port, and including a parallel module through which the data to be transferred passes, said module performing at least one of (a) buffering data passing through the module, and (b) reformatting the data to be compatible with a format protocol for the memory/peripheral receiving an output from the module.

14. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels; a channel arbiter which selects the channel for which said component provides access control at a given time; and wherein at least one of said channels is for transferring packetized data in at least one direction between a memory and a packetized data source through a packetized data port, and including a packetized data module through which the data to be transferred passes, said module performing at least one of (a) buffering data passing through the module, and (b) reformatting the data to be compatible with a format protocol for the memory/packetized data source receiving an output from the module.

15. An access controller as claimed in claim 14 wherein data packets from said packetized data source may be of variable length, wherein a said channel for transferring data packets from the packetized data source to memory is divided into N channels, N being an integer greater than one, each of said N channels being for memory buffers of different size, the one of said N channels used for transfer of a received data packet being the channel having the smallest available buffer in which the received data packet will fit.

16. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels; and a channel arbiter which selects the channel for which said component provides access control at a given time; and wherein each channel is for memory accesses in one direction between a memory and a second element, wherein said component includes a first component which controls addressing and data transfer for memory accesses through said channels, and at least one second component through which data passes for at least one channel during a memory access for such channel, the second component performing at least one of (a) buffering data passing through the module, and (b) reformatting the data to be compatible with a format protocol for the memory/second element receiving an output from the second component.

17. An access controller as claimed in claim 16 wherein said second element is a peripheral.

18. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels; and a channel arbiter which selects the channel for which said component provides access control at a given time; and wherein at least one of said channels if for transfer of data between a first memory and a second memory of said computer system memory, wherein said context memory includes an indication of a start address in one of said memory from which data to be transferred is read out, an indication of a start address in the other of said memory at which the data is to be written and an indication of the quantity of data to be transferred, wherein said component includes at least one first component for controlling the addressing of said memories and at least one second component for controlling data transfers for said memories, and including a holding register for storing the data to be transferred between a read access to said one memory and a write access to said other memory.

19. An access controller for a computer system memory, at least portions of which are accessible through a plurality of channels, including:

a context memory storing information relating to the current state of each channel;

a component utilizing context memory information for a channel to control a memory access for the channel, at least a portion of said component being time shared by said channels;

a channel arbiter which selects the channel for which said component provides access control at a given time; and a bus through which transfers for said system memory pass, said component controlling at least selected data transfers through said bus; and wherein at least selected memory components of said system memory are connected to transfer data with at least one other system component without passing through said bus, said component providing controls for each such transfer.

20. An access controller as claimed in claim 19 including a main CPU which accesses said system memory through said bus and a second CPU which shares at least a portion of said system memory with said main CPU, said component controlling accesses to said at least a portion of systems memory by said second CPU.

21. An access controller as claimed in claim 19 wherein transfers of data are performed through said bus between an external device and system memory, wherein said component includes a controller which normally interfaces with said context memory to control memory accesses and a module through which accesses are performed, and wherein said module includes elements for passing data between said external device and system memory under control of the external device without substantial involvement of said controller.

22. An access controller for controlling the transfer of variable length packetized data (VLPD) from a VLPD source to a system memory including:

N channels through which said transfer of VLPD may be effected, where N is an integer greater than one, each of said channels controlling transfers to buffers of different size in said system memory, an indicator as to the availability of a buffer for each channel to receive date, a mechanism receiving an indication of the size of a VLPD to be transferred, and a mechanism utilizing said availability indicator and size indication to determine the channel for the smallest available buffer in which the VLPD to be transferred will fit, said controller utilizing the determined channel to store the VLPD in said smallest available buffer.

23. A method for controlling the transfer of variable length packetized data (VLPD) from a VLPD source to a system memory including:

provFiding N channels though which said transfer of VLPD may be effected, where N is an integer greater than one, each of said channels controlling transfers to buffers of different size in said system memory; indicating the availability of a buffer for each channel to receive data;

receiving an indication of the size of each VLPD to be transferred;

utilizing said availability indicator and size indication to determine the channel for the smallest available buffer in which the VLPD to be transferred will fit; and utilizing the determined channel to store the VLPD in said smallest available buffer.

* * * * *